Figure 1:
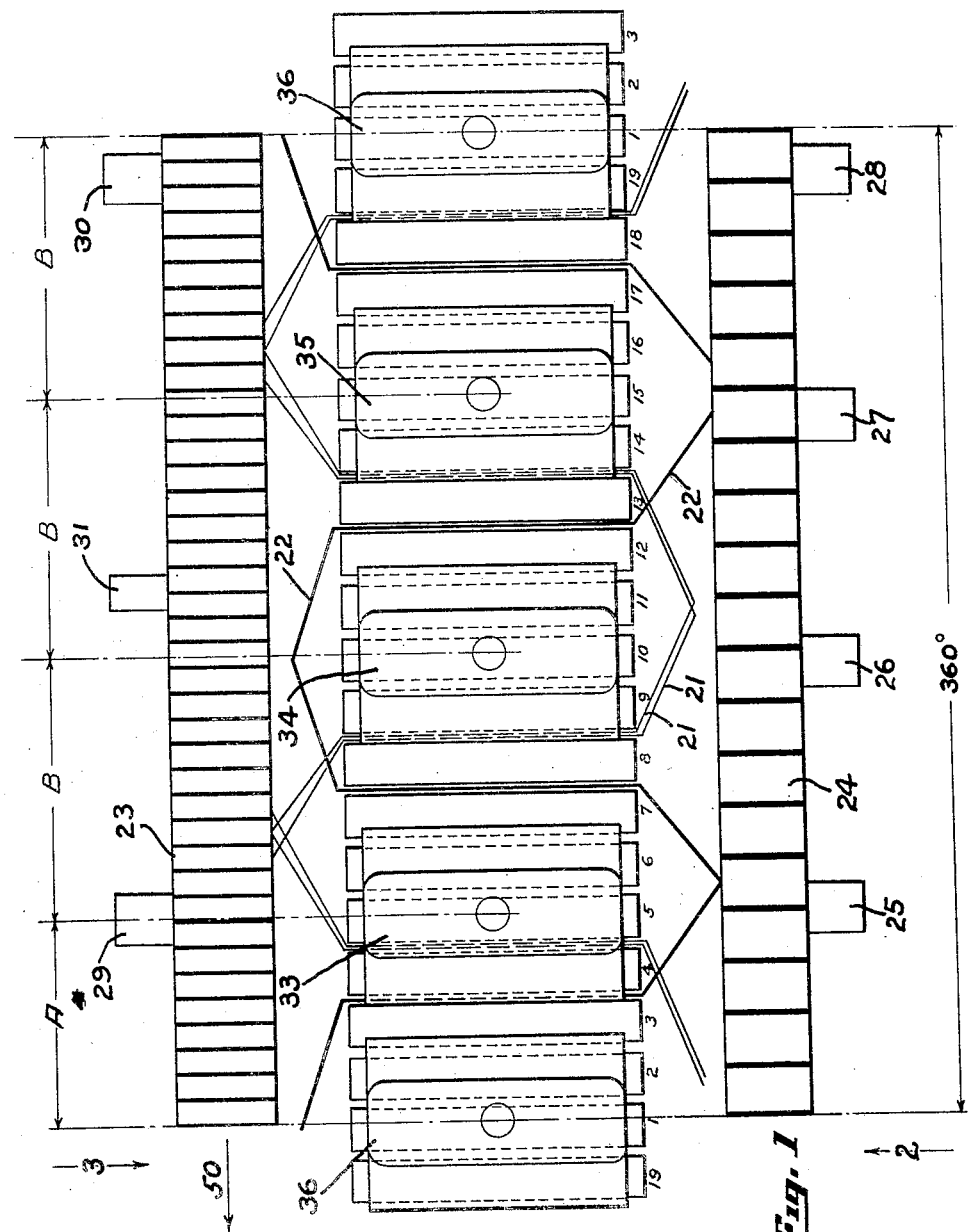

Aug. 12, 1924.

N. R. HAAS

DYNAMO ELECTRIC MACHINE

Filed July 12, 1920    2 Sheets-Sheet 2

1,504,551

Witnesses
Irvin A. Greenwald
Walter N. Riedel

Inventor
Nelson R. Haas
By Forrest B. MacNab
Attorney

Patented Aug. 12, 1924.

1,504,551

UNITED STATES PATENT OFFICE.

NELSON R. HAAS, OF DAYTON, OHIO, ASSIGNOR TO THE DAYTON ENGINEERING LABORATORIES COMPANY, OF DAYTON, OHIO, A CORPORATION OF OHIO.

DYNAMO-ELECTRIC MACHINE.

Application filed July 12, 1920. Serial No. 395,504.

*To all whom it may concern:*

Be it known that I, NELSON R. HAAS, a citizen of the United States of America, residing at Dayton, county of Montgomery, and State of Ohio, have invented certain new and useful Improvements in Dynamo-Electric Machines, of which the following is a full, clear, and exact description.

This invention relates to dynamo-electric machines and has among its objects the elimination of the humming noise which is generally believed to be due to the rapid cutting of the lines of magnetic force by the teeth of the armature core.

One manner of accomplishing the above object is to so arrange the pole pieces that the vibrations which tend to be set up in one pole piece will counteract vibrations which tend to be set up in another pole piece.

In the preferred embodiment of the invention disclosed herein, I preferably arrange the pole pieces with respect to an armature having an odd number of core teeth in such a manner that the trailing pole tips of the several pole pieces are passed simultaneously by the armature core teeth. In other words, during the operation of the armature, the armature teeth are made to whip by each of the trailing pole tips of the field poles in synchronism so that there is a synchronous cutting through and moving away from the lines of magnetic flux by the armature teeth.

Other and further objects of the present invention will be apparent from the following description, reference being had to the accompanying drawings, wherein a preferred embodiment of the present invention is clearly shown.

Figure 2:
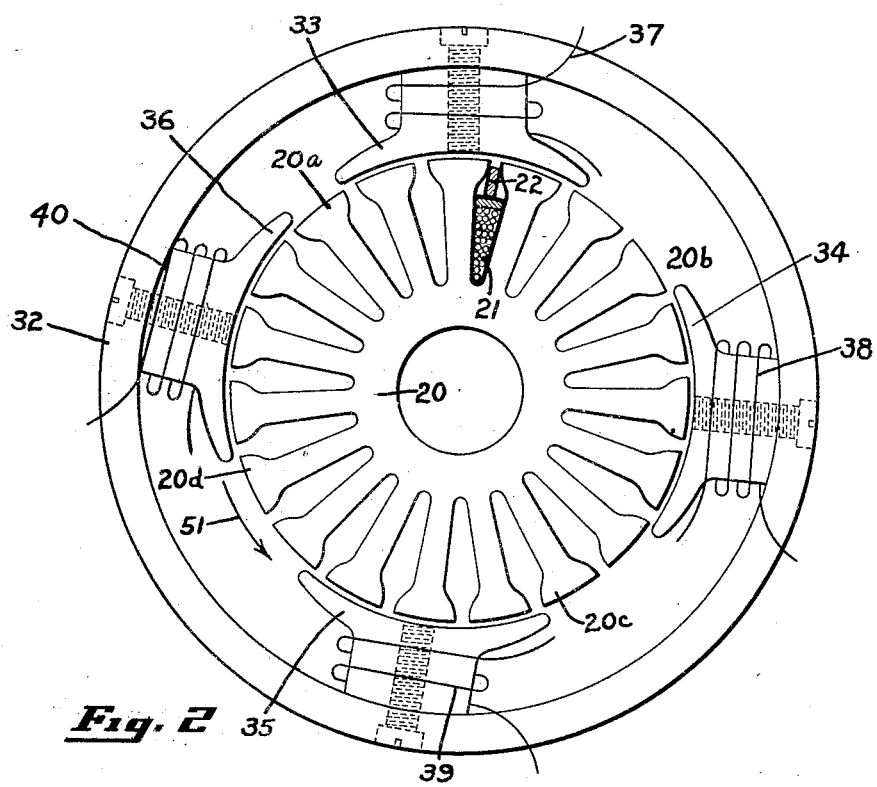
Figure 3:
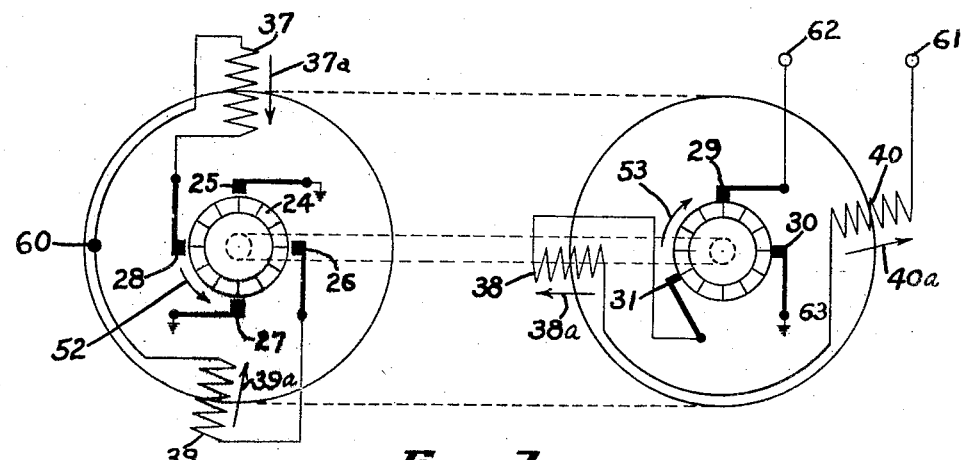

In the drawings:

Fig. 1 is a diagrammatic view showing a development of the armature and field of a dynamo-electric-machine embodying the present invention;

Fig. 2 is an end view of the dynamo field shown by the development in Fig. 1, together with an end view of the armature core, certain armature conductors being shown in section; and Fig. 3 is a wiring diagram showing a single unit dynamo-electric-machine embodying the present invention, said machine being adapted for use as a motor to start an engine or as a generator, driven by the engine, to charge a battery.

In the drawings, 20 designates an armature core provided with generator armature windings, certain of which are indicated by numeral 21, and carrying motor armature windings, certain of which are indicated by numeral 22. As shown more clearly in Fig. 1, the generator windings are 180° wave wound and are connected with a commutator 23, a development of this commutator being shown in Fig. 1. The motor armature windings 22 are also 180° wave wound and are connected with a motor commutator 24, a development of which is shown in Fig. 1.

Motor brushes 25, 26, 27 and 28 conduct current toward and away from the motor commutator 24. Brushes 29 and 30 are the main generator brushes while brush 31 is connected in series with a generator shunt field for regulating purposes. The field frame 32 supports pole pieces 33, 34, 35 and 36, carrying windings 37, 38, 39 and 40, respectively.

The direction of rotation of armature 20 is designated by arrow 50 in Fig. 1, by arrow 51 in Fig. 2 and by arrows 52 and 53 in Fig. 3. It is understood that the left-hand portion of Fig. 3 is taken looking in the direction of arrow 2 of Fig. 1, and that the right-hand portion of Fig. 3 is taken looking in the direction of arrow 3 of Fig. 1. It will be understood also that Fig. 2 is taken looking in the direction of arrow 2 of Fig. 1.

It will be noted that the arrangement of the poles is such that the trailing pole tips of poles 33 to 36, inclusive, are simultaneously passed by certain armature teeth, namely, the core teeth 20$^a$, 20$^b$, 20$^c$ and 20$^d$, respectively. By such a construction and arrangement it has been found that the humming noise which is generally present during the operation of dynamos at comparatively high speed, has been materially reduced. This reduction in noise is believed to be due to the fact that the magnetic path or paths, which are concentrated by means of the pole pieces of the field and caused to enter into and pass out of the armature core, are simultaneously intercepted and passed away from by certain of the armature core teeth. The repeated departure from the magnetic field concentrated at the trailing end of a pole piece, of the armature core teeth, is believed to set up vibrations in the polar projection itself and these vibrations are impressed on the field shell or frame. Now where all of the field poles tend to vibrate in synchronism and these vibrations are transferred to the field frame at asymmetrical points thereon it is thought that these tendencies counterbalance each other and thereby substantially reduce the humming noise.

It will be noted that in the embodiments shown in Figs. 1 and 2 there is an odd number of armature core teeth, in this instance, 19. Where such an armature core is used with a 4 pole dynamo, it is found necessary to arrange the field poles in a non-symmetrical relation in order that the foregoing objects of the invention may be accomplished as previously described. It has been found, however, that such a polar arrangement does not necessitate the departure from the usual arrangement of brushes upon a commutator.

Fig. 3 shows diagrammatically how the present invention has been applied to a single unit engine starting and generating device which is particularly shown, described and claimed in the copending application of William A. Chryst, Serial No. 367,631, filed March 22, 1920. The windings 37 and 39 are employed as motor field windings, and are connected with a terminal 60 which may be connected in any suitable manner with a battery or other current source. These windings 37 and 39 are also connected with brushes 28 and 26, normally out of engagement with the commutator. When brushes 25, 26, 27 and 28 are brought into engagement with the commutator 24, the machine will operate as a series wound motor. It is understood that the motor circuit is completed by means of a ground connection from brushes 25 and 27, which leads to the current source. It will be noted that although it is necessary to space the pole pieces so that the angular space B indicated in Fig. 1 is greater than 90°, while the angular space A is less than 90°, yet the brushes 25, 26, 27 and 28 may still be arranged 90° apart and good commutation can be secured.

Referring again to Fig. 3 the windings 38 and 40 are used as generator shunt field windings, and are connected in series with the terminal 61 and with the third brush 31. One of the main brushes 29 may be connected with the terminal 62 while the other main brush 30 may be connected with the grounded terminal 63. The angular space between these brushes may still be 90° although the windings 38 and 40 are not diametrically opposite one another and the winding 38 is not diametrically opposite the brush 30. Even with such an arrangement good commutation may be secured.

From the foregoing it is apparent that the present invention may be readily applied to devices already in use, wherein it is desirable to maintain the brushes in conventional relation to one another.

It will be understood that a 4-pole effect is produced by the windings 37 and 39 since these windings are arranged so as to produce magnetomotive force in the directions of the arrows 37$^a$ and 39$^a$, respectively. It will be noted also that the windings 38 and 40 produce magnetomotive force in the direction of the arrows 38$^a$ and 40$^a$, respectively. In this manner a 4-pole effect is produced by the two generator windings 38 and 40.

While the form of mechanism herein shown and described constitutes a preferred form of embodiment of the invention, it is to be understood that other forms might be adopted, all coming within the scope of the claims which follow.

What I claim is as follows:

1. In a dynamo-electric-machine, the combination of a supporting means; a plurality of pole pieces attached to the said means at irregular intervals; and an armature core having teeth adapted to simultaneously pass the trailing tips of the pole pieces.

2. In a dynamo-electric-machine, the combination of a supporting means; a plurality of pole pieces attached to the said means at irregular intervals; and an armature core having an odd number of teeth adapted to pass the trailing tips of the pole pieces simultaneously.

3. In a dynamo-electric-machine, the combination with an armature having a core provided with an odd number of teeth; of a field having a plurality of pole pieces so spaced that their trailing pole tips will be passed simultaneously by certain of the armature teeth.

In testimony whereof I hereto affix my signature.

NELSON R. HAAS.

Witnesses:
H. E. SOLLENBERGER,
C. D. MILLER.